(12) United States Patent
Ishioka

(10) Patent No.: US 10,017,180 B2
(45) Date of Patent: Jul. 10, 2018

(54) VEHICLE CONTROL APPARATUS, VEHICLE CONTROL METHOD, AND VEHICLE CONTROL PROGRAM

(71) Applicant: HONDA MOTOR CO., LTD., Tokyo (JP)

(72) Inventor: Atsushi Ishioka, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/297,259

(22) Filed: Oct. 19, 2016

(65) Prior Publication Data

US 2017/0120912 A1 May 4, 2017

(30) Foreign Application Priority Data

Oct. 28, 2015 (JP) .................................. 2015-212115

(51) Int. Cl.
*B60W 30/16* (2012.01)
*B60W 40/00* (2006.01)
*B60W 40/04* (2006.01)
*B60W 30/14* (2006.01)

(52) U.S. Cl.
CPC .......... *B60W 30/16* (2013.01); *B60W 30/143* (2013.01); *B60W 40/04* (2013.01); *B60K 2310/24* (2013.01); *B60K 2310/26* (2013.01); *B60W 2550/141* (2013.01);

(Continued)

(58) Field of Classification Search
CPC ...... B60W 30/00; B60W 30/14; B60W 30/16; B60W 30/143; B60W 40/00; B60W 40/04; B60K 31/00; B60K 31/0008; B60K 2031/005

See application file for complete search history.

(56) References Cited

U.S. PATENT DOCUMENTS

| 6,115,652 A * | 9/2000 | Sato ..................... B60W 10/06 701/117 |
| 6,768,446 B2 * | 7/2004 | Tamatsu ................. G01S 7/414 342/107 |

(Continued)

FOREIGN PATENT DOCUMENTS

| JP | A-10-124799 | 5/1998 |
| JP | A-2004-122822 | 4/2004 |

(Continued)

OTHER PUBLICATIONS

JP Office Action dated Sep. 5, 2017 from corresponding Japanese patent application No. 2015-212115 (with attached English-language translation).

*Primary Examiner* — Yonel Beaulieu
(74) *Attorney, Agent, or Firm* — Drinker Biddle & Reath LLP

(57) ABSTRACT

A vehicle control apparatus includes a specification unit configured to specify a speed of an object located in front of an own vehicle and a distance between the object and the own vehicle, a calculation unit configured to calculate a target speed of the own vehicle on the basis of the speed of the object specified by the specification unit and a value based on the distance, and a traveling control unit configured to control traveling of the own vehicle on the basis of the target speed calculated by the calculation unit.

10 Claims, 12 Drawing Sheets

(52) U.S. Cl.
CPC . *B60W 2550/302* (2013.01); *B60W 2550/308* (2013.01); *B60W 2550/402* (2013.01)

(56) References Cited

U.S. PATENT DOCUMENTS

| | | | | |
|---|---|---|---|---|
| 8,788,134 | B1* | 7/2014 | Litkouhi | B62D 15/0255 701/23 |
| 2003/0218564 | A1* | 11/2003 | Tamatsu | G01S 7/414 342/70 |
| 2005/0187698 | A1* | 8/2005 | Arai | B60K 31/0008 701/96 |
| 2009/0088941 | A1* | 4/2009 | Tsuchiya | B60K 31/0075 701/93 |
| 2010/0082212 | A1* | 4/2010 | Miyajima | B60K 31/0066 701/70 |
| 2013/0110343 | A1 | 5/2013 | Ichikawa et al. | |
| 2013/0261945 | A1* | 10/2013 | Marcy | G08G 5/0008 701/121 |
| 2014/0195093 | A1* | 7/2014 | Litkouhi | B62D 15/0255 701/23 |
| 2015/0100216 | A1* | 4/2015 | Rayes | B60W 30/143 701/96 |

FOREIGN PATENT DOCUMENTS

| | | |
|---|---|---|
| JP | A-2008-149892 | 7/2008 |
| JP | A-2015-063246 | 4/2015 |
| WO | WO-2011/158347 A1 | 12/2011 |

* cited by examiner

VEHICLE CONTROL APPARATUS, VEHICLE CONTROL METHOD, AND VEHICLE CONTROL PROGRAM

CROSS REFERENCE TO RELATED APPLICATIONS

Priority is claimed on Japanese Patent Application No. 2015-212115, filed Oct. 28, 2015, the content of which is incorporated herein by reference.

BACKGROUND OF THE INVENTION

Field of the Invention

The present invention relates to a vehicle control apparatus, a vehicle control method, and a vehicle control program.

Description of Related Art

Recently, technology for automatically changing lanes during traveling according to a relative relationship between an own vehicle and a peripheral vehicle has been desired. In relation to this technology, there is a driving assistance device including an instruction means for issuing an instruction for starting automatic driving according to an operation of a driver, a setting means for setting a destination of the automatic driving, a determination means for determining a mode of the automatic driving according to whether a destination has been set when the driver operates the instruction means, and a control means for controlling the traveling of a vehicle on the basis of the mode of the automatic driving determined by the determination means, wherein the determination means determines the mode of the automatic driving as the automatic driving in which the vehicle travels along a current travel route of the own vehicle or an automatic stop when the destination is not set (for example, see WO 2011/158347).

SUMMARY OF THE INVENTION

However, in the conventional technology, it may be impossible to precisely control the behavior of a vehicle because a traveling speed of an own vehicle is calculated on the basis of a distance between the own vehicle and a front traveling vehicle.

An aspect according to the present invention has been made in view of such circumstances and an objective of the aspect is to provide a vehicle control apparatus, a vehicle control method, and a vehicle control program capable of controlling the behavior of a vehicle with higher precision.

To achieve the above-mentioned objective, the present invention adopts the following aspects.

(1) According to an aspect of the present invention, a vehicle control apparatus is provided including: a specification unit configured to specify a speed of an object located in front of an own vehicle and a distance between the object and the own vehicle; a calculation unit configured to calculate a target speed of the own vehicle on the basis of the speed of the object specified by the specification unit and a value based on the distance; and a traveling control unit configured to control traveling of the own vehicle on the basis of the target speed calculated by the calculation unit.

(2) In aspect (1), the calculation unit may calculate the target speed of the own vehicle on the basis of the speed of the object specified by the specification unit and a difference between the distance and a target distance.

(3) In aspect (2), the calculation unit may calculate the target speed of the own vehicle by adding the speed of the object specified by the specification unit to a value obtained by multiplying the difference between the distance and the target distance by a first weight coefficient.

(4) In aspect (2) or (3), the calculation unit may calculate the target distance by multiplying the speed of the object specified by the specification unit by a time required for the own vehicle to arrive at a current position of the object.

(5) in any one of aspects (1) to (4), the calculation unit may further calculate the target speed of the own vehicle on the basis of a relative speed between the object and the own vehicle.

(6) In aspect (5), the calculation unit may calculate the target speed of the own vehicle by adding the speed of the object specified by the specification unit, a value obtained by multiplying a difference between the distance and a target distance by a first weight coefficient, and a value obtained by multiplying the relative speed by a second weight coefficient.

(7) In any one of aspects (1) to (6), the specification unit may specify speeds of a plurality of objects located in front of the own vehicle and distances between the plurality of objects and the own vehicle, the calculation unit may calculate a plurality of target speeds of the own vehicle in correspondence with the plurality of objects, and the traveling control unit may control the traveling of the own vehicle on the basis of a lowest target speed of the plurality of target speeds of the own vehicle calculated by the calculation unit.

(8) In any one of aspects (1) to (6), when the own vehicle enters a lane different from a traveling lane, the specification unit may specify speeds of a plurality of objects located in front of the own vehicle and distances between the plurality of objects and the own vehicle, the calculation unit may calculate a plurality of target speeds of the own vehicle in correspondence with a plurality of objects, and the traveling control unit may control the traveling of the own vehicle on the basis of a lowest target speed of the plurality of target speeds of the own vehicle calculated by the calculation unit.

(9) According to an aspect of the present invention, a vehicle control apparatus is provided including: a specification unit configured to specify a speed of a front traveling vehicle traveling in front of an own vehicle, an inter-vehicle distance between the front traveling vehicle and the own vehicle, and a distance between a merging point located in front of the own vehicle and the own vehicle; a calculation unit configured to calculate a first target speed of the own vehicle on the basis of the speed of the front traveling vehicle specified by the specification unit and a value based on the inter-vehicle distance, and calculate a second target speed of the own vehicle on the basis of the distance between the merging point and the own vehicle specified by the specification unit; and a traveling control unit configured to control traveling of the own vehicle on the basis of a lower target speed of the first target speed and the second target speed calculated by the calculation unit.

(10) In aspect (9), the traveling control unit may control the traveling of the own vehicle without considering the lower target speed of the first target speed and the second target speed if the own vehicle is joinable at the merging point.

(11) According to an aspect of the present invention, a vehicle control method is provided including: specifying, by an on-vehicle computer, a speed of an object located in front of an own vehicle and a distance between the object and the own vehicle; calculating, by the on-vehicle computer, a target speed of the own vehicle on the basis of the specified speed of the object and a value based on the distance; and controlling, by the on-vehicle computer, traveling of the own vehicle on the basis of the calculated target speed.

(12) According to an aspect of the present invention, a vehicle control program is provided for causing an on-vehicle computer to: specify a speed of an object located in front of an own vehicle and a distance between the object and the own vehicle; calculate a target speed of the own vehicle on the basis of the specified speed of the object and a value based on the distance; and control traveling of the own vehicle on the basis of the calculated target speed.

According to aspects (1) to (3), (11), and (12), it is possible to control the behavior of a vehicle with higher precision because the target speed of the own vehicle is calculated on the basis of the speed of the front traveling vehicle and the distance between the object and the own vehicle, and because the traveling of the own vehicle is controlled on the basis of the calculated target speed of the own vehicle.

According to aspect (4), it is possible to calculate the target speed with higher safety because the calculation unit calculates the target speed by multiplying the speed of the object by a time required for the own vehicle to arrive at a current position of the object.

According to aspect (5), it is possible to control the behavior of the vehicle with higher precision because the calculation unit further calculates the target speed of the own vehicle on the basis of the relative speed between the object and the own vehicle.

According to aspect (6), it is possible to calculate a more appropriate target speed because the calculation unit may calculate the target speed of the own vehicle by adding the value obtained by multiplying the difference between the distance and the target distance by the first weight coefficient and the value obtained by multiplying the relative speed by the second weight coefficient.

According to aspect (7), it is possible to control the behavior of a vehicle with higher precision even when the plurality of objects are located in front of the own vehicle because the traveling control unit may control the traveling of the own vehicle on the basis of the lowest target speed of the plurality of target speeds of the own vehicle calculated by the calculation unit.

According to aspect (8), it is possible to smoothly change lanes after confirming that changing lanes is safe because the traveling of the own vehicle is controlled on the basis of the lowest target speed of the plurality of target speeds of the own vehicle calculated by the calculation unit if the own vehicle enters a lane different from the traveling lane.

According to aspects (9) and (10), it is possible to smoothly join after confirming that changing lanes is safe because the first target speed of the own vehicle is calculated on the basis of the speed of the front traveling vehicle and the value based on the inter-vehicle distance, the second target speed is calculated on the basis of the distance between the merging point and the own vehicle, and the traveling of the own vehicle is controlled on the basis of the lower target speed of the first target speed and the second target speed.

DETAILED DESCRIPTION OF THE INVENTION

Hereinafter, embodiments of a vehicle control apparatus, a vehicle control method, and a vehicle control program of the present invention will be described with reference to the drawings.

First Embodiment

[Vehicle Configuration]

Figure 1:
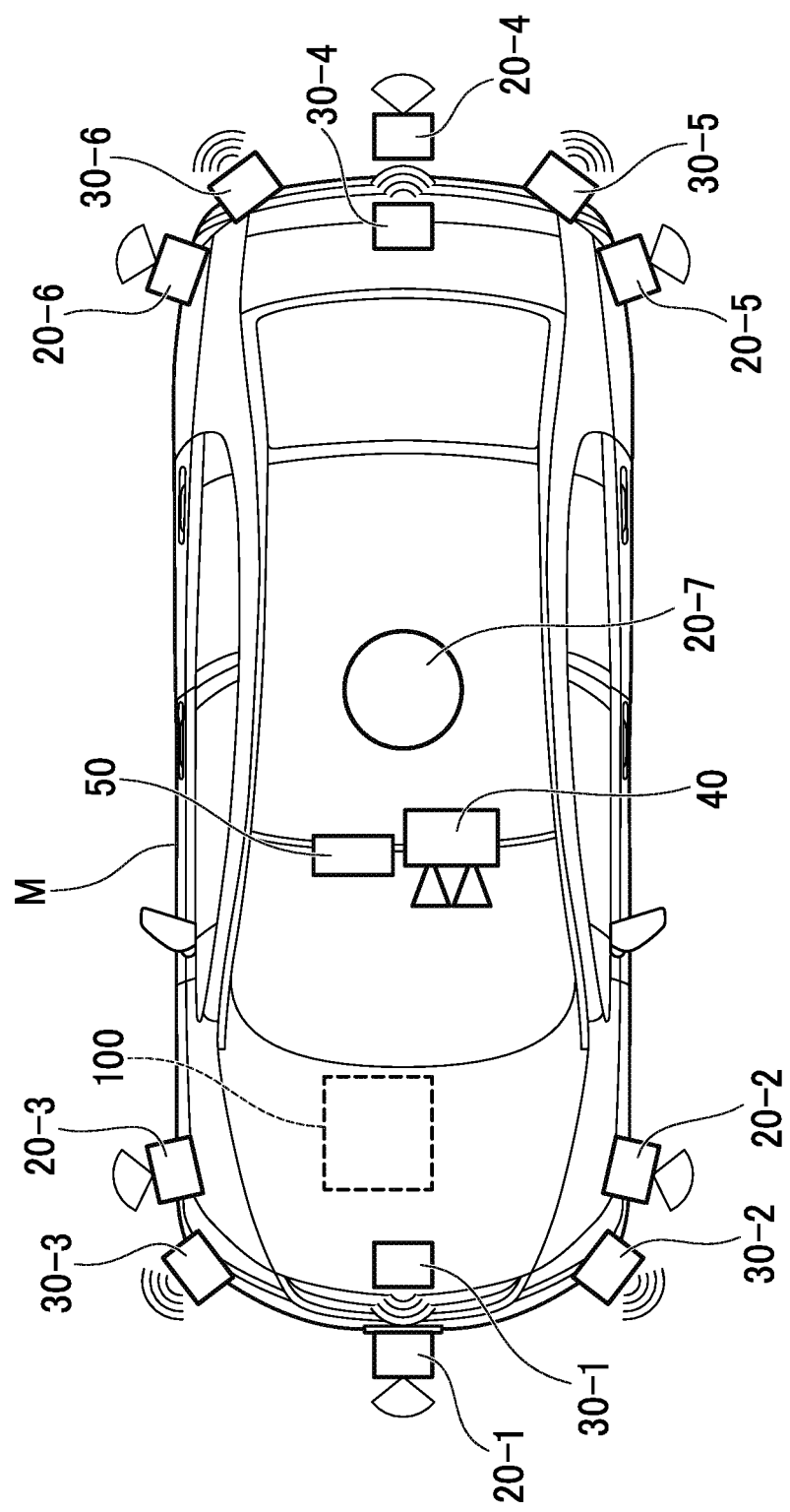
FIG. 1 is a diagram illustrating components provided in a vehicle (hereinafter referred to as an own vehicle M) equipped with a vehicle control apparatus 100 according to a first embodiment.

FIG. 1 is a diagram illustrating components provided in a vehicle (hereinafter referred to as an own vehicle M) equipped with a vehicle control apparatus 100 according to the first embodiment. The vehicle equipped with the vehicle control apparatus 100 is, for example, a vehicle with two wheels, three wheels, four wheels, or the like and includes a vehicle having an internal combustion engine such as a diesel engine or a gasoline engine as a power source, an electric vehicle having an electric motor as a power source, a hybrid vehicle having both an internal combustion engine and an electric motor, etc. Also the above-mentioned electric vehicle is driven using power discharged by, for example, a cell such as a secondary cell, a hydrogen fuel cell, a metal fuel cell, or an alcohol fuel cell.

As illustrated in FIG. 1, sensors such as finders 20-1 to 20-7, radars 30-1 to 30-6, and a camera 40, a navigation apparatus 50, and the above-mentioned vehicle control apparatus 100 are mounted in the own vehicle M. Each of the finders 20-1 to 20-7 is, for example, light detection and ranging or laser imaging detection and ranging (LIDAR) for measuring scattered light in regards to irradiation of light and measuring a distance to a target. For example, the finder 20-1 is attached to a front grille or the like, and the finders 20-2 and 20-3 are attached to a side surface of a vehicle body, a door mirror, an inside of a head lamp, the vicinity of a side marker lamp, or the like. The finder 20-4 is attached to a trunk lid or the like, and the finders 20-5 and 20-6 are attached to the side surface of the vehicle body, an inside of a taillight, or the like. The above-mentioned finders 20-1 to 20-6 have, for example, a detection area of about 150 degrees in a horizontal direction. Also, the finder 20-7 is attached to a roof or the like. The Finder 20-7 has, for example, a detection area of 360 degrees in the horizontal direction.

Each of the above-mentioned radars 30-1 and 30-4 is, for example, a long-range millimeter wave radar having a wider detection area than other radars in a depth direction. Also, each of the radars 30-2, 30-3, 30-5, and 30-6 is a medium-range millimeter wave radar having a narrower detection area than the radars 30-1 and 30-4 in the depth direction. Hereinafter, the finders 20-1 to 20-7 are simply referred to as a "finder 20" unless otherwise specifically distinguished and the radars 30-1 to 30-6 are simply referred to as "radar 30" unless otherwise specifically distinguished. The radar 30 detects a physical object in, for example, a frequency modulated continuous wave (FM-CW) scheme.

The camera 40 is a digital camera using a solid-state imaging element such as, for example, a charge coupled device (CCD) or a complementary metal oxide semiconductor (CMOS). The camera 40 is attached to an upper portion of a front windshield, a backside of a rearview mirror, or the like. The camera 40, for example, periodically and iteratively images a front part of the own vehicle M.

Also, the configuration illustrated in FIG. 1 is merely an example, some of the components may be omitted, and other components may be further added.

Figure 2:
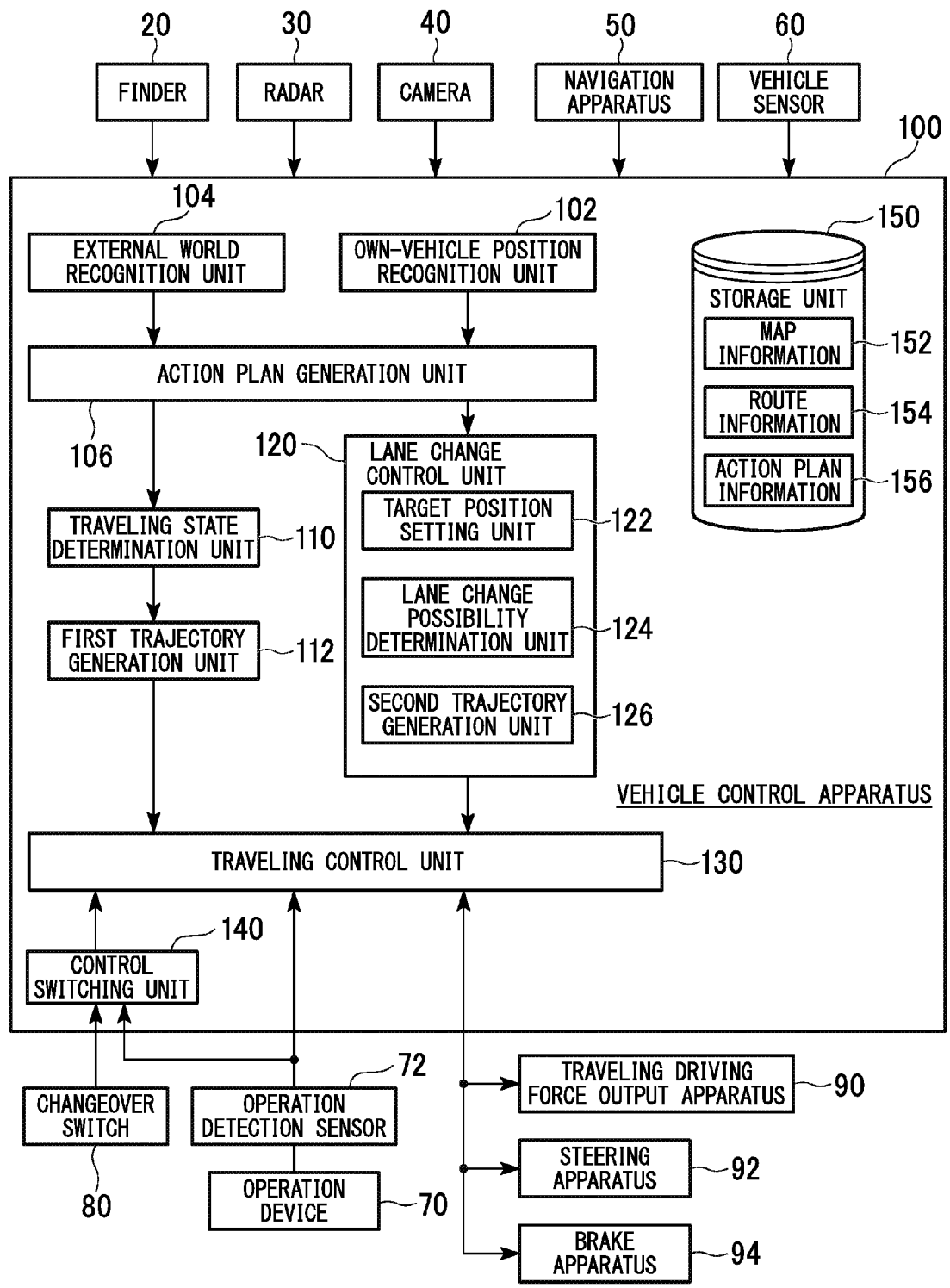
FIG. 2 is a functional configuration diagram of the own vehicle M focusing on the vehicle control apparatus 100 according to the first embodiment.

FIG. 2 is a functional configuration diagram of the own vehicle M focusing on the vehicle control apparatus 100 according to the first embodiment. The own vehicle M is equipped with the navigation apparatus 50, a vehicle sensor 60, an operation device 70, an operation detection sensor 72, a changeover switch 80, a traveling driving force output apparatus 90, a steering apparatus 92, a brake apparatus 94, and the vehicle control apparatus 100 in addition to the finder 20, the radar 30, and the camera 40. These apparatuses and devices are mutually connected through a multiplex communication line or a serial communication line such as a controller area network (CAN) communication line or a wireless communication network.

The navigation apparatus 50 has a global navigation satellite system (GNSS) receiver or map information (a navigation map), a touch panel type display apparatus which functions as a user interface, a speaker, a microphone, etc. The navigation apparatus 50 specifies a position of the own vehicle M using the GNSS receiver and derives a route from the position to a destination designated by a user. The route derived by the navigation apparatus 50 is stored in a storage unit 150 as route information 154. The position of the own vehicle M may be specified or complemented by an inertial navigation system (INS) using an output of the vehicle sensor 60. Also, the navigation apparatus 50 performs guidance by a sound or navigation display in regards to a route up to a destination when the vehicle control apparatus 100 executes a manual drive mode. Also, a configuration for specifying the position of the own vehicle M may be provided independently of the navigation apparatus 50. Also, the navigation apparatus 50 may be implemented by a function of a terminal apparatus such as, for example, a function of a smartphone possessed by the user or a terminal apparatus such as a tablet terminal. In this case, transmission/reception of information is performed wirelessly or through communication between the terminal apparatus and the vehicle control apparatus 100. Also, the configuration for specifying, the position of the own vehicle M may be provided independently of the navigation apparatus 50.

The vehicle sensor 60 includes a vehicle speed sensor which detects vehicle speed, an acceleration sensor which detects acceleration, a yaw rate sensor which detects angular speed around a vertical axis, an azimuth sensor which detects a direction of the own vehicle M, or the like.

The traveling driving force output apparatus 90 includes, for example, an engine and an engine electronic control unit (ECU) which controls the engine if the own vehicle M is a vehicle having an internal combustion engine as a power source, includes a traveling motor and a motor ECU which controls the traveling motor if the own vehicle M is an electric vehicle having an electric motor as a power source, and includes an engine, an engine ECU, a traveling motor, and a motor ECU if the own vehicle M is a hybrid vehicle. If the traveling driving force output apparatus 90 includes only an engine, an engine ECU adjusts a degree of opening of a throttle of the engine, a shift stage, or the like according to information input from a traveling control unit 130, which will be described below, and outputs a traveling driving force (torque) for the vehicle to travel. Also, if the traveling driving force output apparatus 90 includes only a traveling motor, a motor ECU adjusts a duty ratio of a pulse width modulation (PWM) signal assigned to the traveling motor according to information input from the traveling control unit 130 and outputs the above-mentioned traveling driving force. Also, if the traveling driving force output apparatus 90 includes an engine and a traveling motor, both an engine ECU and a motor ECU control the traveling driving force in cooperation with each other according to information input from the traveling control unit 130.

The steering apparatus 92 includes, for example, an electric motor, a steering torque sensor, a steering angle sensor, etc. The electric motor changes, for example, a direction of a steering wheel by causing a force to act on a rack and pinion function or the like. The steering torque sensor detects, for example, torsion of a torsion bar when the steering wheel is operated as steering torque (a steering force). The steering angle sensor detects, for example, a steering angle (or an actual steering angle). The steering apparatus 92 causes the electric motor to drive according to the information input from the traveling control unit 130 and changes the direction of the steering wheel.

The brake apparatus 94 includes a master cylinder which transmits a brake operation performed on a brake pedal as an oil pressure, a reservoir tank which stores brake fluid, a brake actuator which adjusts a braking force output to each vehicle wheel, and the like. The brake control unit 44 controls the brake actuator or the like so that a brake torque according to a pressure of the master cylinder is output to each vehicle wheel according to information input from the traveling control unit 130. Also, the brake apparatus 94 is not limited to an electronic control type brake apparatus which is operated by the above-described oil pressure, and may be an electronic control type brake apparatus which is operated by an electronic actuator.

The operation device 70 includes, for example, an accelerator pedal, a steering wheel, a brake pedal, a shift lever, etc. The operation detection sensor 72 which detects a presence, absence, or amount of operation by a driver is attached to the operation device 70. The operation detection sensor 72 includes, for example, an accelerator opening sensor, a steering torque sensor, a brake sensor, a shift position sensor, etc. The operation detection sensor 72 outputs a degree of accelerator opening, a steering torque, an amount of brake depression, a shifted position, etc. serving as detection results to the traveling control unit 130. Also, in place of this, a detection result of the operation detection sensor 72 may be directly output to the driving force output apparatus 90, the steering apparatus 92, or the brake apparatus 94.

The changeover switch 80 is a switch to be operated by the driver or the like. The changeover switch 80 may be, for example, a mechanical switch installed in the steering wheel, a trim (a dashboard), or the like or may be a graphical user interface (GUI) switch provided in a touch panel of the navigation apparatus 50. The changeover switch 80 receives an operation of the driver or the like, generates a control mode designation signal for designating a control mode by the traveling control unit 130 as one of an automatic drive mode and a manual drive mode, and outputs the control mode designation signal to a control switching unit 140. The automatic drive mode is a drive mode in which a vehicle travels in a state in which a driver does not perform an operation (or an amount of operation is less or an operation frequency is lower than in the manual drive mode) as mentioned above. More specifically, the automatic drive mode is a drive mode in which some or all of the traveling driving force output apparatus 90, the steering apparatus 92, and the brake apparatus 94 are controlled on the basis of an action plan.

[Vehicle Control Apparatus]

Hereinafter, the vehicle control apparatus 100 will be described. The vehicle control apparatus 100 includes, for example, an own-vehicle position recognition unit 102, an external world recognition unit 104, an action plan generation unit 106, a traveling state determination unit 110, a first trajectory generation unit 112, a lane change control unit 120, a traveling control unit 130, the control switching unit 140, and the storage unit 150. Some or all of the own-vehicle position recognition unit 102, the external world recognition unit 104, the action plan generation unit 106, the traveling state determination unit 110, the first trajectory generation unit 112, the lane change control unit 120, the traveling control unit 130, and the control switching unit 140 are software function units which function by a processor such as a central processing unit (CPU) executing a program. Also, some or all of the units may be hardware function units such as large scale integration (LSI) and an application specific integrated circuit (ASIC). Also, the storage unit 150 is implemented by a read-only memory (ROM), a random access memory (RAM), a hard disk drive (HDD), a flash memory, etc. A program to be executed by the processor may be pre-stored in the storage unit 150 and may be downloaded from an external apparatus via an on-vehicle Internet facility or the like. Also, a portable storage medium storing a program may be mounted in a drive apparatus (not illustrated) and installed in the storage unit 150.

The own-vehicle position recognition unit 102 recognizes a lane along which the own vehicle M travels (a traveling lane) and a relative position of the own vehicle M in regards to the traveling lane on the basis of information input from map information 152 stored in the storage unit 150, the finder 20, the radar 30, the camera 40, the navigation apparatus 50, or the vehicle sensor 60. The map information 152 is, for example, map information having more precision than a navigation map provided in the navigation apparatus 50 and may include information of a center of a lane or information about a boundary of a lane. More specifically, the map information 152 includes road information, traffic control information, address information (an address and a postal code), facility information, telephone number information, etc. The road information includes information indicating a type of road such as a highway, a toll road, a national road, or a prefectural road and information about the number of lanes of the road, a width of each road, a gradient of the road, a position (three-dimensional coordinates including longitude, latitude, and elevation) of the road, a curvature of a curve of a lane, positions of merging and branching points of the lane, a sign provided on the road, etc. The traffic control information includes information indicating that the lane is blocked due to construction, traffic accidents, traffic jams, or the like.

Figure 3:
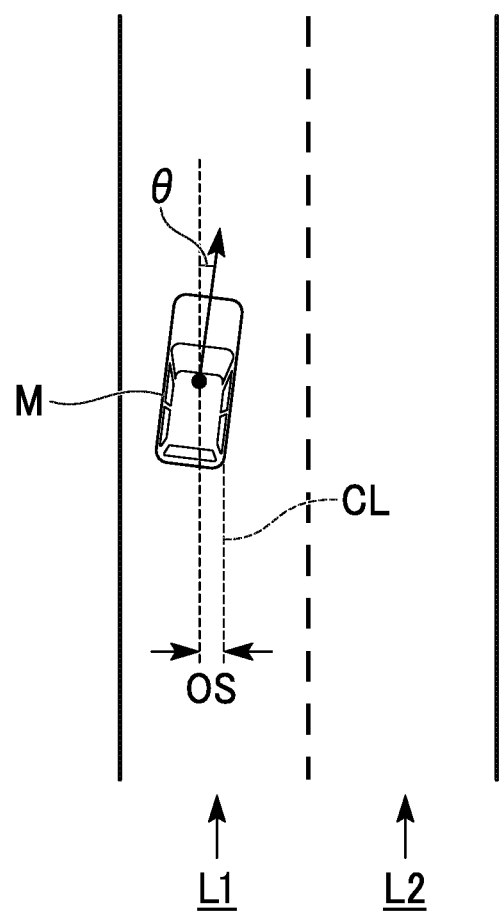
FIG. 3 is a diagram illustrating a state in which an own-vehicle position recognition unit 102 recognizes a relative position of the own vehicle M in regards to a traveling lane L1.

FIG. 3 is a diagram illustrating a state in which the own-vehicle position recognition unit 102 recognizes a relative position of the own vehicle M in regards to a traveling lane L1. The own-vehicle position recognition unit 102 recognizes, for example, a gap OS from a traveling lane center CL of a reference point (for example, a center of gravity) of the own vehicle M and an angle θ formed with respect to a line lined with the traveling lane center CL of a traveling direction of the own vehicle M as a relative position of the own vehicle M in regards to the traveling lane L1. Also, in place of this, the own-vehicle position recognition unit 102 may recognize a position of a reference point of the own vehicle M or the like for one side end of the own-vehicle lane L1 as the relative position of the own vehicle M in regards to the traveling lane.

The external world recognition unit 104 recognizes a position and states of speed and acceleration of a peripheral vehicle on the basis of information input from the finder 20, the radar 30, the camera 40, etc. The peripheral vehicle in the present embodiment is a vehicle which travels in the same direction as the own vehicle M and is a vehicle which travels around the own vehicle M. The position of the peripheral vehicle may be indicated by a representative point such as a center of gravity or a corner of the other vehicle or indicated by an area in which an outline of the other vehicle is represented. The "state" of the peripheral vehicle may include whether the peripheral vehicle accelerates or makes a lane change (or whether a lane change is intended) on the basis of information of the above-mentioned various types of devices. Also, the external world recognition unit 104 may recognize positions of other physical objects such as a guardrail, a utility pole, a parked vehicle, and a pedestrian in addition to a peripheral vehicle.

The action plan generation unit 106 generates an action plan in a predetermined section. The predetermined section is, for example, a section in which the vehicle passes through a toll road such as a highway among routes derived by the navigation apparatus 50. Also, the action plan generation unit 106 is not limited thereto, but may generate an action plan for arbitrary section.

The action plan is constituted of, for example, a plurality of events which are sequentially executed. The events include, for example, a deceleration event for causing the own vehicle M to decelerate, an acceleration event for causing the own vehicle M to accelerate, a lane keeping event for causing the own vehicle M to travel without deviating from a traveling lane, a lane change event for changing traveling lanes, a passing event for causing the own vehicle M to pass a front traveling vehicle, a branching event for causing the own vehicle M to change its lane to a desired lane or causing the own vehicle M to travel without deviating from a current traveling lane at a branching point, a merging event for causing the own vehicle M to accelerate or decelerate or make a traveling lane change in a merging lane for joining a main lane, etc. For example, if a junction (a branching point) is on a toll road (for example, a highway or the like), it is necessary for the vehicle control apparatus 100 to change its lane or keep its lane so that the own vehicle M moves in a direction of a destination in the automatic drive mode. Accordingly, when the map information 152 is referred to and it is determined that a junction is on a road, the action plan generation unit 106 sets the lane change event for changing its lane to a desired lane along which the own vehicle M can move in the direction of the destination from a current position (coordinates) of the own vehicle M to a position (coordinates) of the junction. Also, information indicating the action plan generated by the action plan generation unit 106 is stored as action plan information 156 in the storage unit 150.

Figure 4:
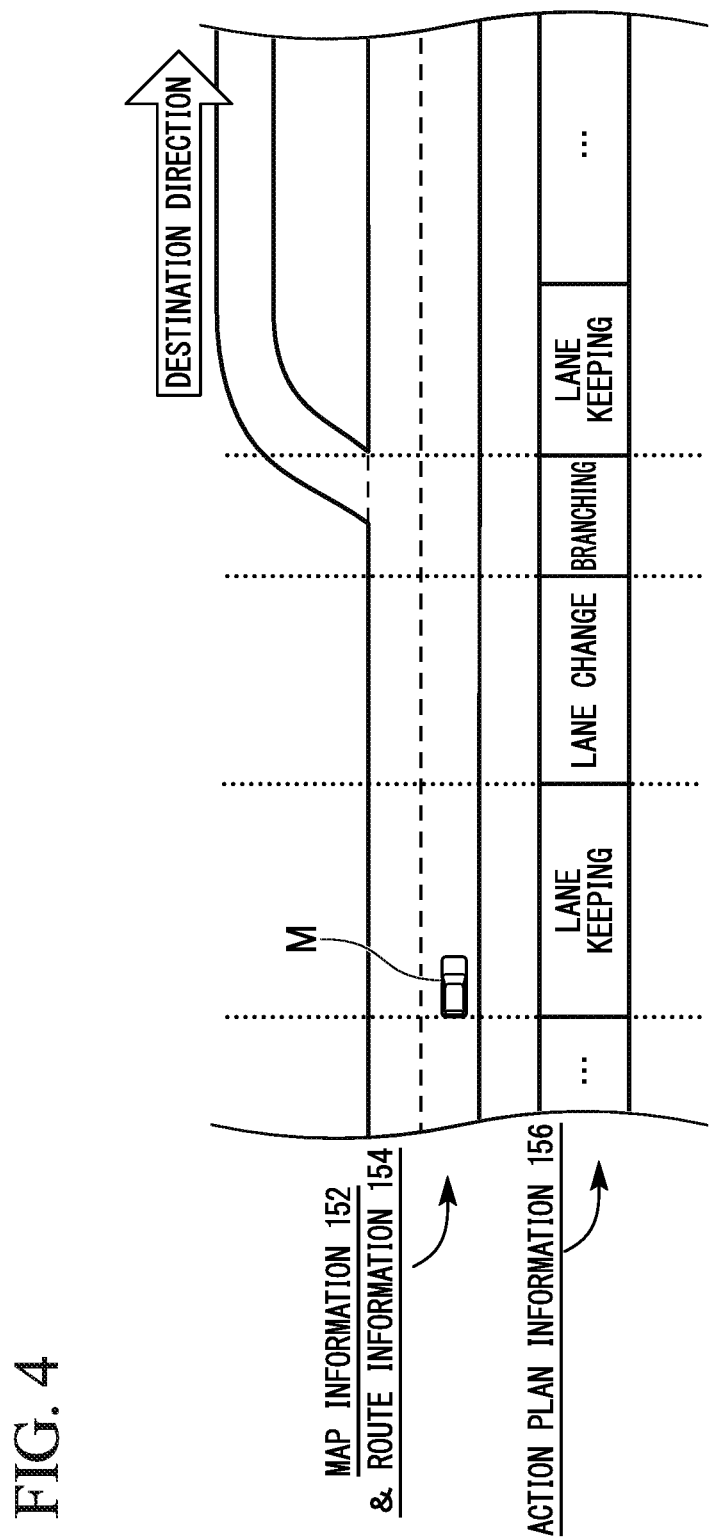
FIG. 4 is a diagram illustrating an example of an action plan generated in a certain section.

FIG. 4 is a diagram illustrating an example of an action plan generated in a certain section. As illustrated, the action plan generation unit 106 classifies a scene occurring in a case in which the own vehicle M has traveled along a route up to a destination and generates an action plan so that an event based on each scene is executed. Also, the action plan generation unit 106 may dynamically change the action plan according to a situation change of the own vehicle M.

The action plan generation unit 106 may change (update), for example, the generated action plan on the basis of a state of an external world recognized by the external world recognition unit 104. Generally, the state of the external world constantly changes while the vehicle travels. In particular, if the own vehicle M travels along a road including a plurality of lanes, a distance interval from another vehicle relatively changes. For example, if a preceding vehicle decelerates by performing abrupt braking or if a vehicle traveling along an adjacent lane cuts in front of the own vehicle M, the own vehicle M needs to travel while appropriately changing its speed or lanes according to the action of the preceding vehicle or the action of the vehicle of the adjacent lane. Accordingly, the action plan generation unit 106 may change an event set for each control section according to the above-mentioned state change of the external world.

Specifically, if the speed of another vehicle recognized by the external world recognition unit 104 has exceeded a threshold value while the own vehicle travels or if a movement direction of another vehicle traveling along a lane adjacent to the own-vehicle lane is an own-vehicle lane direction, the action plan generation unit 106 changes an event set in a section in which the own vehicle M is scheduled to travel. For example, if the event is set so that the lane change event is executed after the lane keeping event, the action plan generation unit 106 changes the next event after the lane keeping event from the lane change to the deceleration event, the lane keeping event, or the like when it is determined that the vehicle has traveled at speed greater than or equal to the threshold value from the rear of a lane change destination during the lane keeping event according to a recognition result of the external world recognition unit 104. Thereby, the vehicle control apparatus 100 avoids a collision of the own vehicle M with a vehicle of the lane change destination. As a result, the vehicle control apparatus 100 can cause the own vehicle M to automatically travel safely even if the state of the external world has changed.

[Lane Keeping Event]

When the lane keeping event included in the action plan is executed by the traveling control unit 130, the traveling state determination unit 110 determines a traveling state of one of constant speed traveling, follow-up traveling, deceleration traveling, cornering traveling, obstacle avoidance traveling, etc. For example, if no other vehicle travels in front of the own vehicle, the traveling state determination unit 110 determines the traveling state as the constant speed traveling. Also, if the own vehicle performs the follow-up traveling in regards to a front traveling vehicle, the traveling state determination unit 110 determines the traveling state as the follow-up traveling. Also, if the external world recognition unit 104 recognizes a deceleration of a front traveling vehicle or if an event such as a stop or parking is executed, the traveling state determination unit 110 determines the traveling state as the deceleration traveling. Also, if the external world recognition unit 104 has recognized that the own vehicle M is approaching a curved road, the traveling state determination unit 110 determines the traveling state as the cornering traveling. Also, if the external world recognition unit 104 has recognized that an obstacle is in front of the own vehicle M, the traveling state determination unit 110 determines the traveling state as the obstacle avoidance traveling.

The first trajectory generation unit 112 generates a trajectory on the basis of the traveling state determined by the traveling state determination unit 110. The trajectory is a set (a locus) of points at which a future target position at which it is assumed that the own vehicle M will arrive is sampled for every predetermined time if the own vehicle M travels on the basis of the traveling state determined by the traveling state determination unit 110. The first trajectory generation unit 112 calculates a target speed of the own vehicle M on the basis of at least a speed of an object OB located in front of the own vehicle M recognized by the own-vehicle position recognition unit 102 or the external world recognition unit 104 and a distance between the own vehicle M and the object OB. The first trajectory generation unit 112 generates a trajectory on the basis of the calculated target speed. The object OB includes a front traveling vehicle, a point such as a merging point, a branching point, or a target point, a physical object such as an obstacle, or the like.

Hereinafter, a technique of calculating a target speed will be described. The first trajectory generation unit 112 calculates the target speed according to, for example, Equation (1). In Equation (1), target_object_vel is speed of the object OB, K1 is a gain, dP is a difference between a distance to the object OB and a target distance calculated on the basis of Equation (2), which will be described below, K2 is a gain, and dV is a difference between the speed of the object OB and a speed of the own vehicle M calculated on the basis of Equation (4), which will be described below. Also, the first trajectory generation unit 112 may omit either "K1*Dp" or "K2*dV" of Equation (1) to calculate the target speed.

$$Vt = \text{target\_object\_vel} + K1^*dP + K2^*dV \quad (1)$$

The first trajectory generation unit 112 calculates dP on the basis of, for example, Equation (2). In Equation (2), target_object_dist is a distance from the own vehicle M to the object OB. In Equation (2), target_dist is a preset target distance between the own vehicle M and the object OB.

$$dP = \text{target\_object\_dist} - \text{target\_dist} \quad (2)$$

Also, the first trajectory generation unit 112 calculates the target distance target_dist on the basis of for example, Equation (3). In Equation (3), Thw is a vehicle headway time or an arrival time. The vehicle headway time is a time from a preceding vehicle passes through a specific point until a subsequent vehicle passes through the specific point. Also, if the object OB is a stationary object, the arrival time is an arrival time required for the own vehicle M to arrive at the object OB.

$$\text{target\_dist} = \text{target\_object\_vel}^*Thw \quad (3)$$

Here, the target distance target_dist is set not to be less than or equal to a minimum target distance MIN_TARGET_DIST. The minimum target distance MIN_TARGET_DIST is a minimum target distance between the own vehicle M and the object OB. The minimum target distance is preset.

The first trajectory generation unit 112 calculates dV on the basis of, for example, Equation (4). In Equation (4), ego_car_vel is a speed of the own vehicle M.

$$dV = \text{target\_object\_vel} - \text{ego\_car\_vel} \quad (4)$$

Here, if an inter-vehicle distance is controlled to be maintained as a set distance, it may be impossible to rapidly control the own vehicle M at a speed which maintains an inter-vehicle distance from a front traveling vehicle as the set inter-vehicle distance.

Conversely, the vehicle control apparatus 100 of the present embodiment calculates the target speed of the own vehicle M on the basis of a speed of the front traveling vehicle set as the object OB and the value based on the inter-vehicle distance. Thereby, even when the front traveling vehicle suddenly decelerates, the vehicle control apparatus 100 can rapidly cause the own vehicle M to decelerate.

Figure 5:
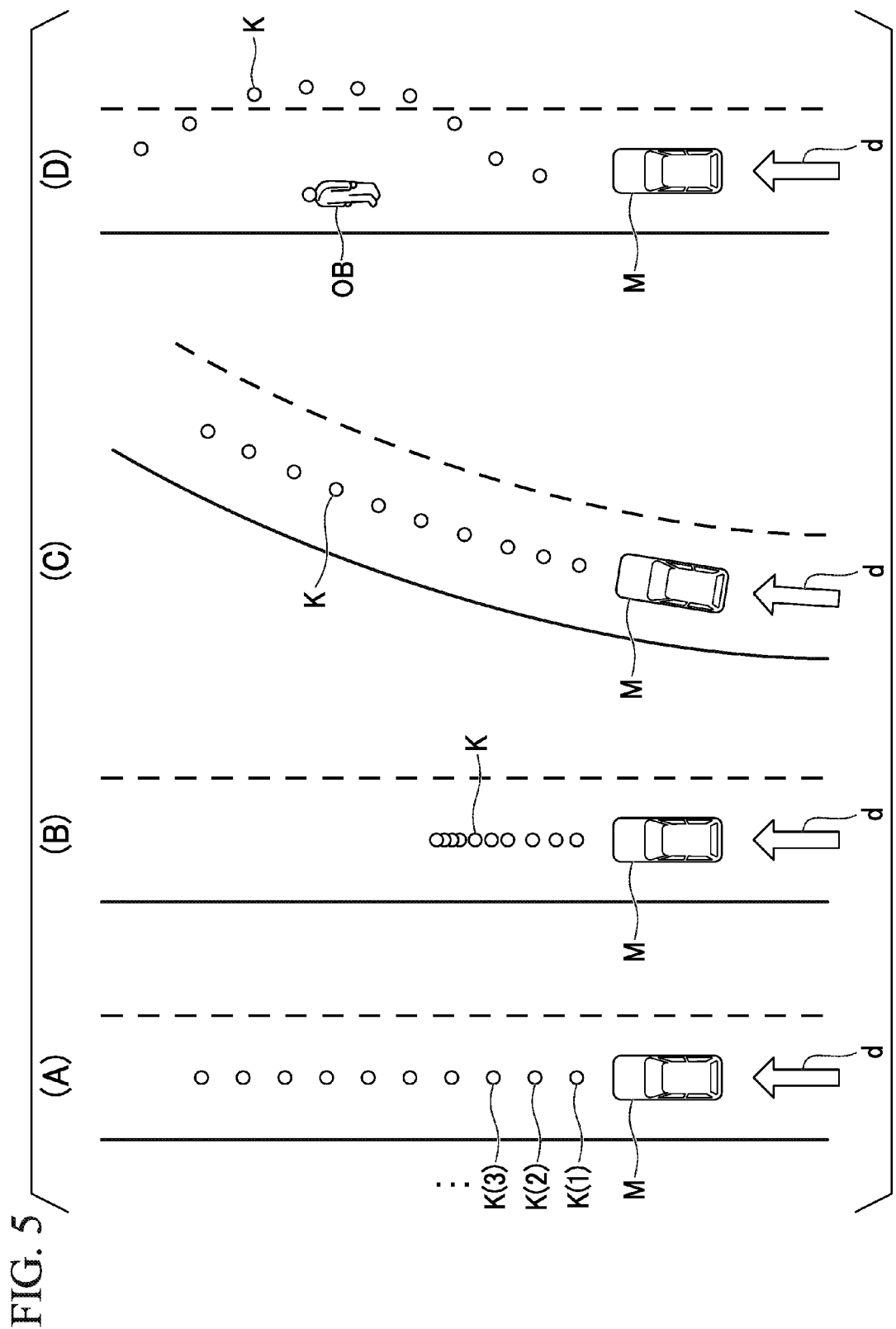
FIG. 5 is a diagram illustrating an example of a trajectory generated by a first trajectory generation unit 112.

Hereinafter, generation of a trajectory in a case in which a presence of the object OB is not considered and a case in which the presence of the object OB is considered will be described. FIG. 5 is a diagram illustrating an example of a trajectory generated by the first trajectory generation unit 112. As illustrated in (A) of FIG. 5, for example, the first trajectory generation unit 112 sets future target positions such as K(1), K(2), K(3), . . . as a trajectory of the own vehicle M every time a predetermined time Δt elapses from a current time on the basis of the current position of the own vehicle M. Hereinafter, these target positions are merely referred to as a "target position K" unless otherwise distinguished. For example, the number of target positions K is determined according to a target time T. For example, the first trajectory generation unit 112 sets the target position K on a center line of a traveling lane at an interval of the predetermined time Δt (for example, 0.1 sec) for 5 sec if the target time T is set to 5 sec, and determines arrangement intervals of a plurality of target positions K on the basis of the traveling state. The first trajectory generation unit 112 may derive, for example, the center line of the traveling lane from information such as a width of the lane included in the map information 152 and may acquire the center line of the traveling lane from the map information 152 if the center line of the traveling lane is previously included in the map information 152.

For example, if the above-mentioned traveling state determination unit 110 determines the traveling state as the constant speed traveling, the first trajectory generation unit 112 generates a trajectory by setting the plurality of target positions K at regular intervals as illustrated in (A) of FIG. 5.

Also, if the traveling state determination unit 110 determines the traveling state as the deceleration traveling (a case in which a preceding vehicle has decelerated in the follow-up traveling is also included), the first trajectory generation unit 112 generates the trajectory by further widening an interval when an arrival time is earlier for the target position K and further narrowing the interval when the arrival time is later for the target position K as illustrated in (B) of FIG. 5. In this case, a front traveling vehicle may be set as the object OB or a point such as a merging point, a branching point, or a target point, a physical object such as an obstacle, or the like other than the front traveling vehicle may be set as the object OB. Thereby, the traveling control unit 130, which will be described below, causes the own vehicle M to decelerate because the target position K at which the arrival time from the own vehicle M is late is close to the current position of the own vehicle M.

Also, as illustrated in (C) of FIG. 5, the traveling state determination unit 110 determines the traveling state as the cornering traveling when a road is a curved road. In this case, the first trajectory generation unit 112 generates a trajectory by arranging the plurality of target positions K while changing a horizontal position in a traveling direction of the own vehicle M (a position of a lane width direction), for example, according to a curvature of the road. Also, as illustrated in (D) of FIG. 5, if an obstacle OB such as a human or a stopped vehicle is on a road in front of the own vehicle M, the traveling state determination unit 110 determines the traveling state as the obstacle avoidance traveling. In this case, the first trajectory generation unit 112 generates a trajectory by arranging the plurality of target positions K so that the own vehicle M travels while avoiding the obstacle OB.

[Lane Change Event]

The lane change control unit 120 performs control when the traveling control unit 130 executes the lane change event included in the action plan. The lane change control unit 120 includes, for example, a target position setting unit 122, a lane change possibility determination unit 124, and a second trajectory generation unit 126. Also, the lane change control unit 120 may perform the following process when the traveling control unit 130 performs the branching event or the merging event.

The target position setting unit 122 specifies a vehicle which travels along a lane adjacent to a lane (an own-vehicle lane) along which the own vehicle M travels and which travels in front of the own vehicle M and a vehicle which travels along the adjacent lane and which travels behind the own vehicle M and sets a target area TA between the vehicles. Hereinafter, the vehicle which travels along the adjacent lane and which travels in front of the own vehicle M will be described by being referred to as a front reference vehicle and the vehicle which travels along the adjacent lane and which travels behind the own vehicle M will be described by being referred to as a rear reference vehicle.

If a predetermined setting condition that no peripheral vehicle is in the target area TA set by the target position setting unit 122 and both a virtual time-to collision (TTC) between the own vehicle M and the front reference vehicle and a virtual TTC between the own vehicle M and the rear reference vehicle are greater than a threshold value is satisfied, the lane change possibility determination unit 124 determines that the own vehicle M can change its lane into the target area TA set on the adjacent lane. The TTC is derived by, for example, assuming that the own vehicle M has changed the lane to the target area TA and dividing an inter-vehicle distance between the virtual own vehicle M in the target area TA and the front reference vehicle (or the rear reference vehicle) by the speed of the own vehicle M and a relative speed of the front reference vehicle (or the rear reference vehicle).

Figure 6:
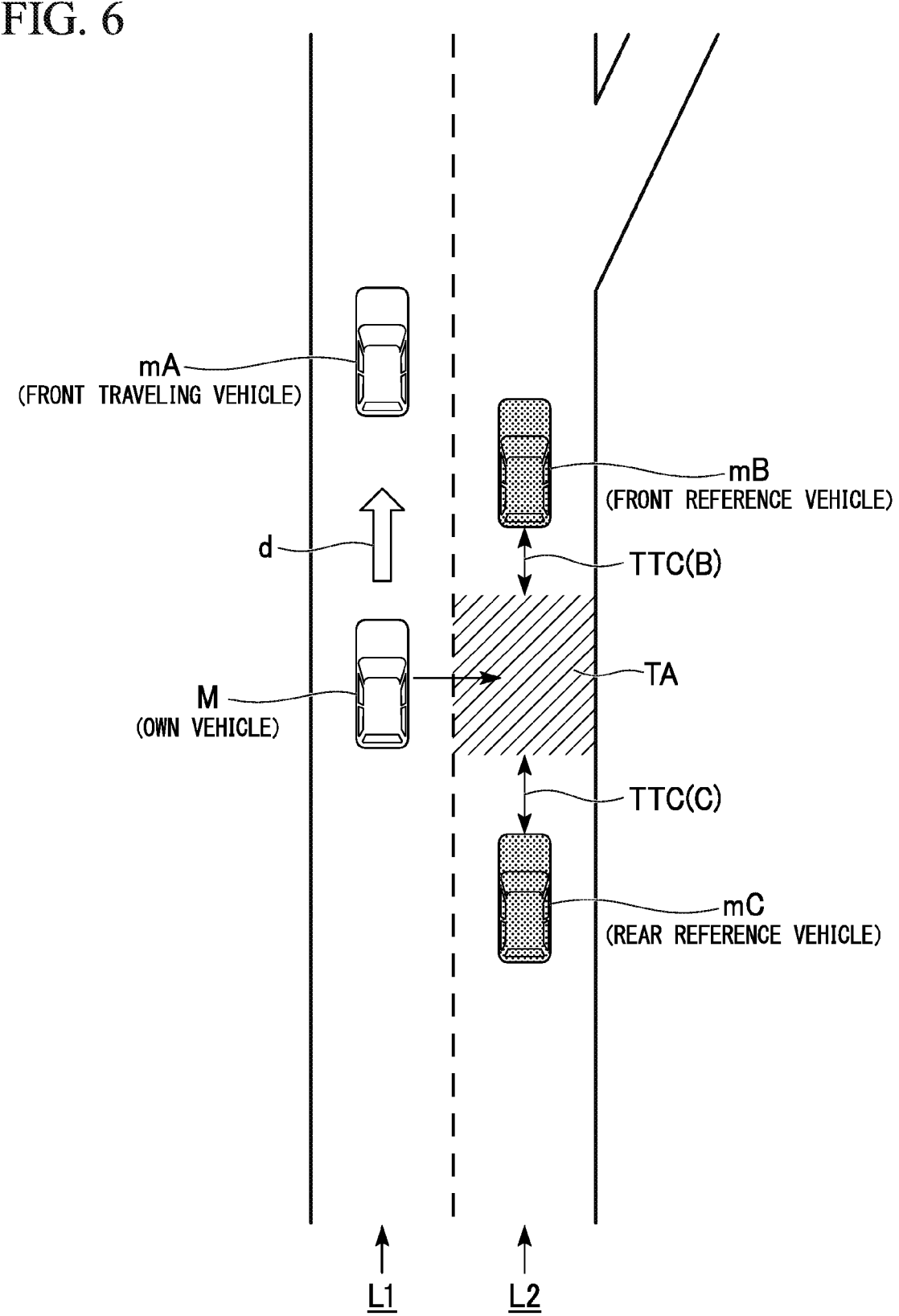
FIG. 6 is a diagram illustrating a state in which a target position setting unit 122 sets a target area TA in the first embodiment.

FIG. 6 is a diagram illustrating a state in which the target position setting unit 122 sets the target area TA in the first embodiment. In FIG. 6, mA denotes a front traveling vehicle, mB denotes a front reference vehicle, and mC denotes a rear reference vehicle. Also, an arrow d denotes a traveling direction of the own vehicle, L1 denotes an own-vehicle lane, and L2 denotes an adjacent lane.

In the case of the example of FIG. 6, the target position setting unit 122 sets the target area TA between the front reference vehicle mB and the rear reference vehicle mC on the adjacent lane L2. In this case, the lane change possibility determination unit 124 virtually arranges the own vehicle M in the target area TA set by the target position setting unit 122 and derives a TTC (B) for the front reference vehicle mB and a TTC (C) for the rear reference vehicle mC on the basis of the virtual own vehicle M. The lane change possibility determination unit 124 determines whether both the two derived TTCs satisfy a predetermined setting condition and determines that the own vehicle M can change the lane into the target area TA set on the adjacent lane L2 if both the TTCs satisfy the predetermined setting condition (for example, if the TTCs are greater than or equal to threshold values set in a front direction and a rear direction). Also, the target position setting unit 122 may set the target area TA behind the rear reference vehicle mC (between the rear reference vehicle mC and a vehicle behind the rear reference vehicle mC) on the adjacent lane L2.

Also, the lane change possibility determination unit 124 may determine whether the own vehicle M can change the lane into the target area TA in consideration of speeds, accelerations, or jerks of the front traveling vehicle mA, the front reference vehicle mB, and the rear reference vehicle mC. For example, if the speeds of the front reference vehicle mB and the rear reference vehicle mC are greater than the speed of the front traveling vehicle mA, and the front reference vehicle mB and the rear reference vehicle mC are expected to pass the front traveling vehicle mA within a range of time required for the own vehicle M to change the lanes, the lane change possibility determination unit 124 determines that the own vehicle M cannot change the lane into the target area TA set between the front reference vehicle mB and the rear reference vehicle mC.

If the above-mentioned lane change possibility determination unit 124 has determined that the own vehicle M can change the lane into the target area TA, the second trajectory generation unit 126 generates a trajectory for changing the lane into the target area TA.

Figure 7:
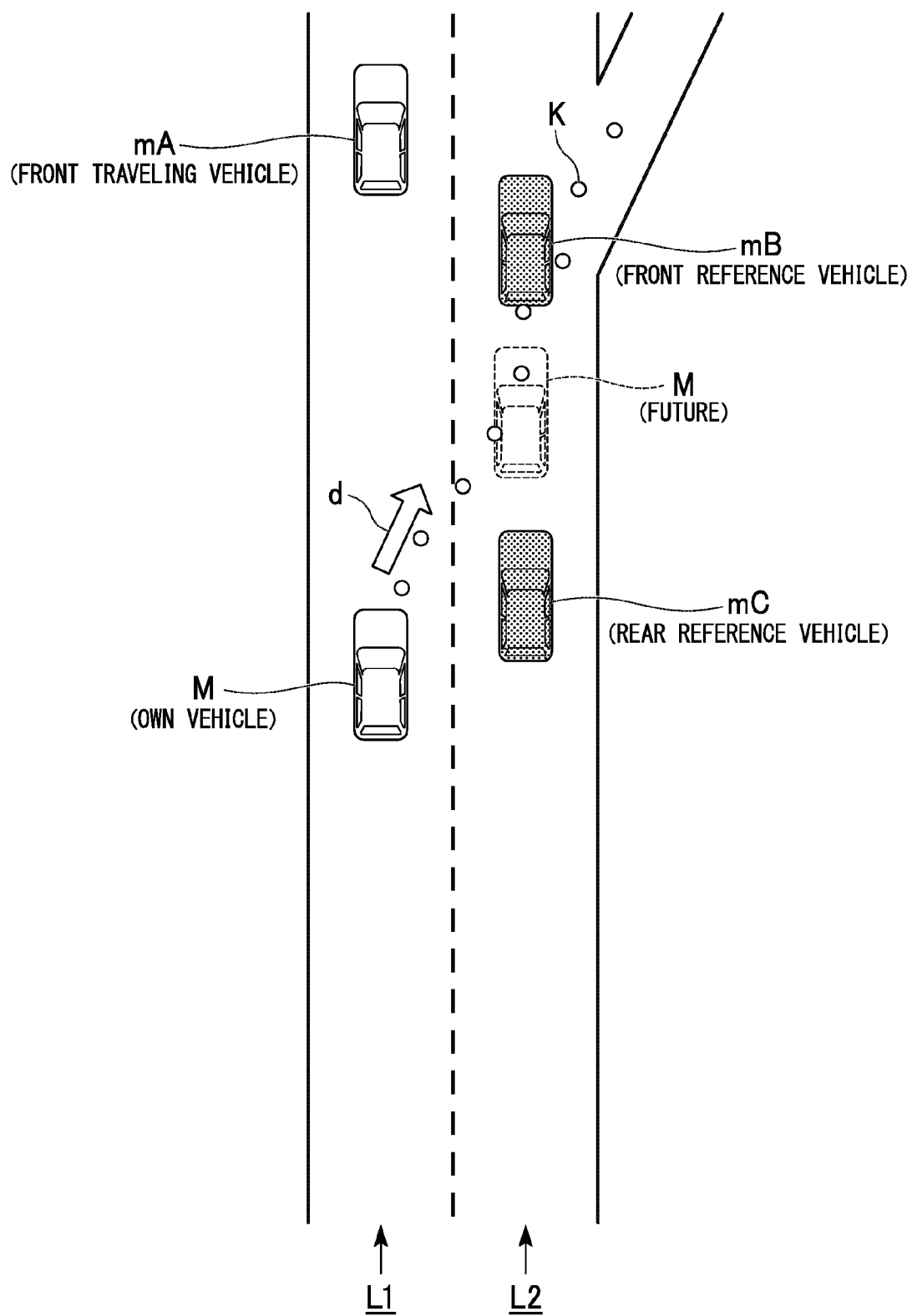
FIG. 7 is a diagram illustrating a state in which a second trajectory generation unit 126 generates a trajectory in the first embodiment.

FIG. 7 is a diagram illustrating a state in which the second trajectory generation unit 126 generates a trajectory in the first embodiment. For example, the second trajectory generation unit 126 assumes that the front reference vehicle mB and the rear reference vehicle mC travel in predetermined speed models and generates a trajectory so that the own vehicle M is between the front reference vehicle mB and the rear reference vehicle mC at a certain time in the future or is located behind the rear reference vehicle mC on the basis of speed models of the three vehicles and a speed of the own vehicle M. For example, the second trajectory generation unit 126 smoothly connects positions from a current position of the own vehicle M to a position of the front reference vehicle mB at a certain time in the future using a polynomial curve such as a spline curve, and arranges a predetermined number of target positions K at regular intervals or irregular intervals on the curve. At this time, the second trajectory generation unit 126 generates a trajectory so that at least one of the target positions K is arranged in the target area TA.

Here, for example, if a predetermined condition such as deceleration of the front traveling vehicle mA or the front reference vehicle mB is satisfied, the second trajectory generation unit 126 performs the following process. The second trajectory generation unit 126 calculates a first target speed of the own vehicle M on the basis of at least a speed of the front traveling vehicle mA located in front of the own vehicle M and a distance between the own vehicle M and the front traveling vehicle mA, and calculates a second target speed of the own vehicle M on the basis of at least a speed of the front reference vehicle mB located in front of the own vehicle M and a distance between the own vehicle M and the front reference vehicle mB. The first target speed is a value calculated on the basis of the above-mentioned Equations (1) to (4) using the front traveling vehicle mA as the object OB, and the second target speed is a value calculated on the basis of the above-mentioned Equations (1) to (4) using the front reference vehicle mB as the object OB. In this case, the second trajectory generation unit 126 selects a lower target speed of the two target speeds, and if the selected target speed is less than a speed obtained from the above-mentioned trajectory for a lane change, the second trajectory generation unit 126 re-generates a trajectory which satisfies the target speed while deferring the lane change. However, when the own vehicle M has traveled from the traveling lane L1 toward the adjacent lane L2 to a certain extent (for example, the own vehicle M straddles a lane line located between the lane L1 and the lane L2 at a predetermined ratio or more), the second trajectory generation unit 126 may calculate the target speed of the own vehicle M on the basis of the speed of the front reference vehicle mB and the distance between the own vehicle M and the front reference vehicle mB without considering the front traveling vehicle mA.

Figure 8:
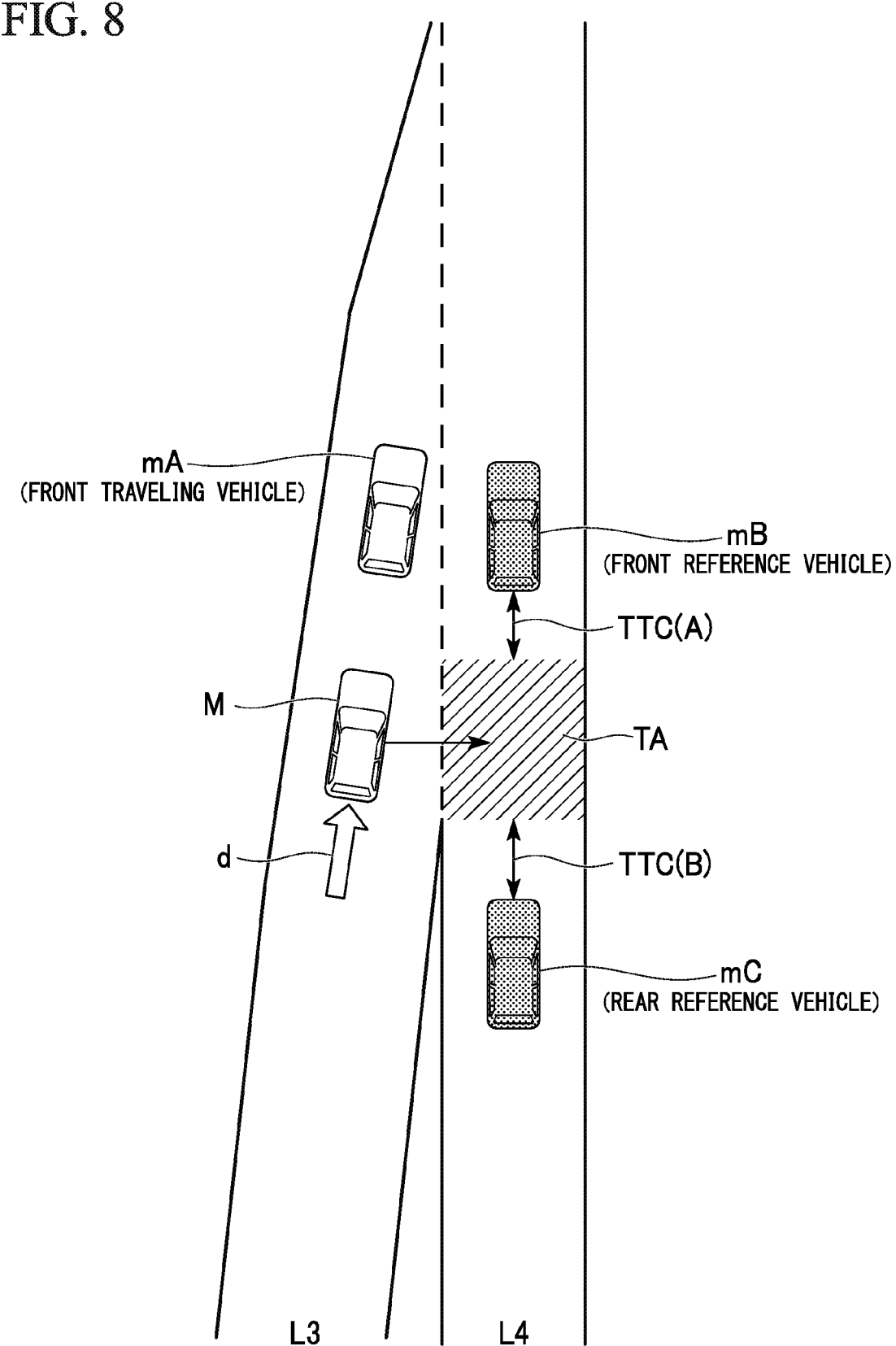
FIG. 8 is a diagram illustrating a determination of lane change possibility at a time of merging.

Also, the lane change possibility determination unit 124 determines whether a lane change serving as merging is possible even when the own vehicle M in a merging lane desires to join a lane (a main lane) of a merging destination. FIG. 8 is a diagram illustrating a determination of lane change possibility at a time of merging. If a predetermined setting condition that no peripheral vehicle is in the target area TA set by the target position setting unit 122 and both a virtual time-to collision (TTC) between the own vehicle M and the front reference vehicle mB and a virtual TTC between the own vehicle M and the rear reference vehicle mC are greater than a threshold value is satisfied, the lane change possibility determination unit 124 determines that the own vehicle M can change the lane into the target area TA set on the adjacent lane. In FIG. 8, mA denotes a front traveling vehicle, mB denotes a front reference vehicle, and mC denotes a rear reference vehicle. Also, an arrow d denotes a traveling direction of the own vehicle M, L3 denotes an own vehicle lane, and L4 denotes a lane (a main lane) of a merging destination.

In the case of the example of FIG. 8, the target position setting unit 122 sets the target area TA between the front reference vehicle mB and the rear reference vehicle mC on the main lane L4. As in the process described with reference to FIG. 6, it is determined that the own vehicle M can join the target area TA set on the main lane L4 if the two TTCs satisfy a predetermined setting condition.

If the above-mentioned lane change possibility determination unit 124 determines that the own vehicle M can change the lane into the target area TA, the second trajectory generation unit 126 generates a trajectory for changing the lane into the target area TA.

Figure 9:
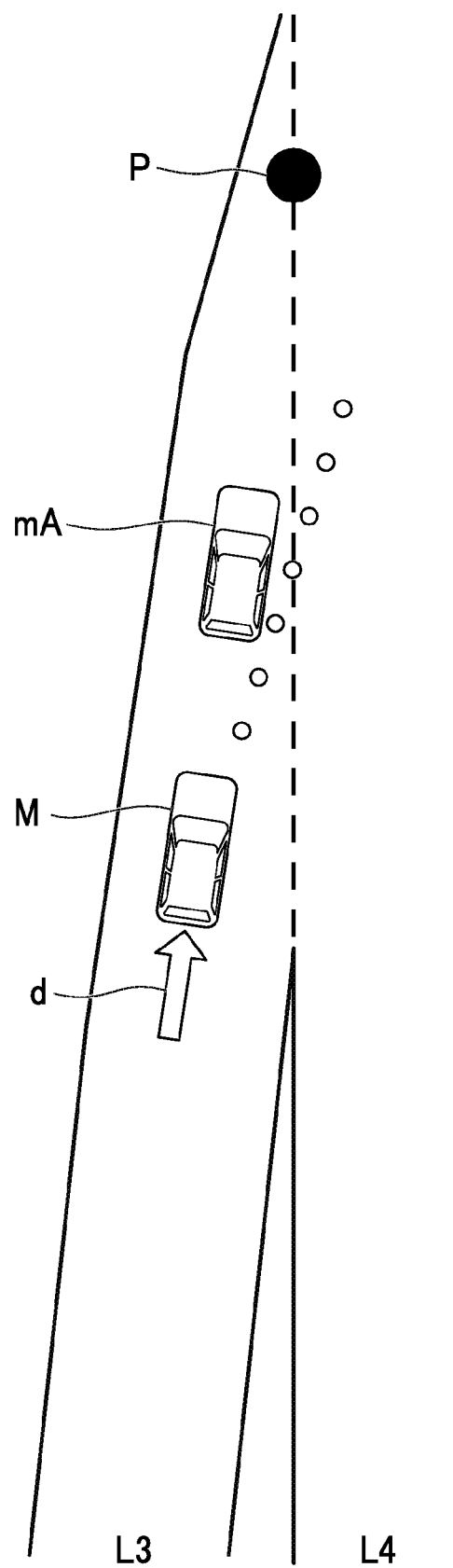
FIG. 9 is a diagram illustrating an example of a scene in which the second trajectory generation unit 126 calculates target speed in the vicinity of a merging point.

FIG. 9 is a diagram illustrating an example of a scene in which the second trajectory generation unit 126 calculates a target speed in the vicinity of a merging point. The merging point P is set, for example, in the vicinity of the merging point of the lane. The merging point P is stored in correspondence with, for example, the merging point of the lane in the map information 152 of the storage unit 150. Also, the vehicle control apparatus 100 may be set on the basis of information of the merging point. At this time, the second trajectory generation unit 126 calculates a first target speed if the front traveling vehicle mA located in front of the own vehicle M serves as the object OB, calculates a second target speed if the merging point P located in front of the own vehicle M serves as the object OB, and controls the traveling of the own vehicle M on the basis of a lower target speed of the calculated first and second target speeds until it is possible to start merging.

Figure 10:
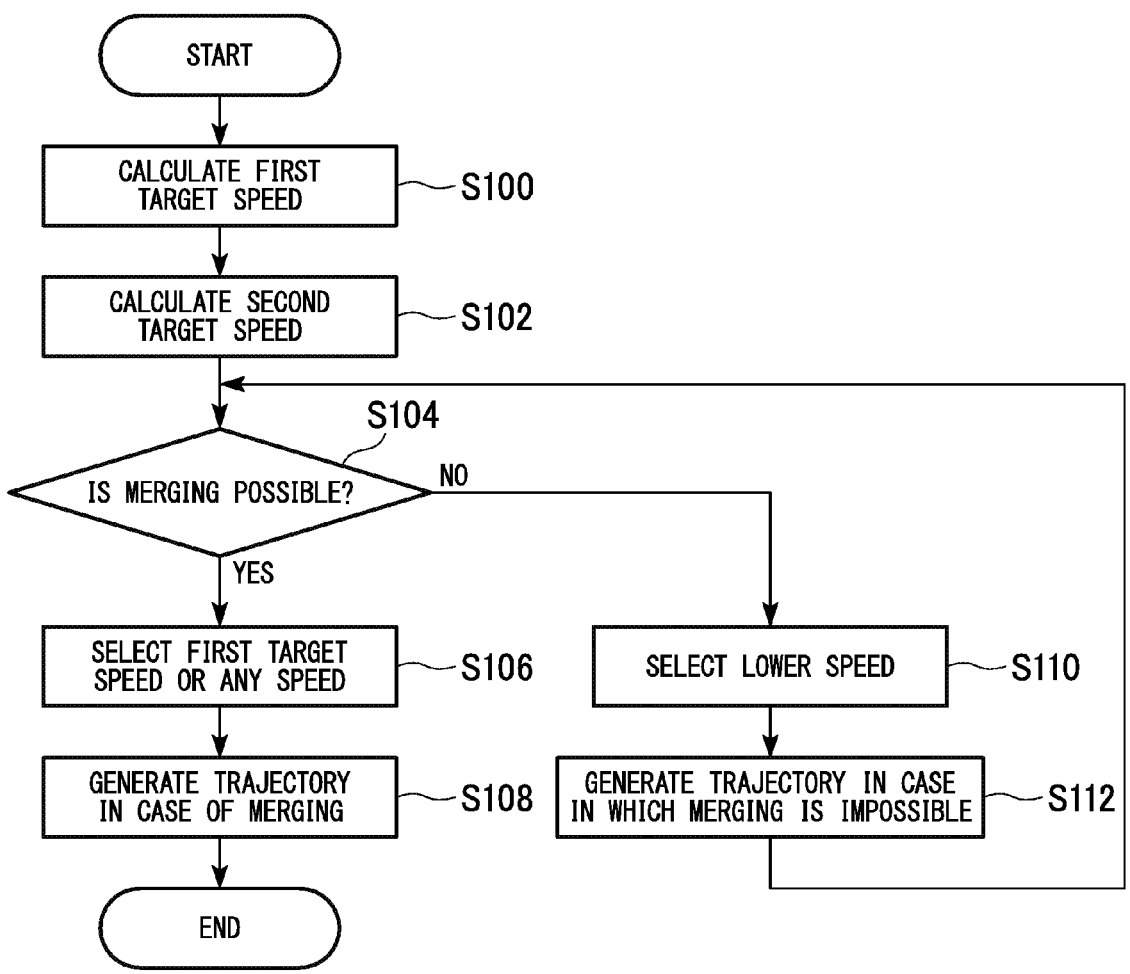
FIG. 10 is a flowchart illustrating an example of a flow of a process of the second trajectory generation unit 126 at a time of merging.

Hereinafter, a process to be executed at a time of merging will be described. FIG. 10 is a flowchart illustrating an example of a flow of a process of the second trajectory generation unit 126 at a time of merging. First, the second trajectory generation unit 126 calculates a first target speed using the front traveling vehicle mA as the object OB (step S100) and calculates a second target speed using the merging point P as the object OB (step S102).

Next, the lane change possibility determination unit 124 determines whether it is possible to join a lane of a merging destination (step S104). If it is determined that it is possible to join the lane of the merging destination, the second trajectory generation unit 126 selects the first target speed or arbitrary speed without depending upon the first and second target speeds (step S106). Next, the second trajectory generation unit 126 generates a trajectory for joining the merging lane at the first target speed or the arbitrary speed selected in step S106 (step S108). Thereby, the traveling control unit 130 changes the lane to the lane L4 of the merging destination on the basis of the generated trajectory.

If it is determined that it is impossible to join the lane of the merging destination, the second trajectory generation unit 126 selects a lower speed of the first target speed and the second target speed (step S110). Next, the second trajectory generation unit 126 generates a trajectory if it is impossible to join the lane of the merging destination (step S112). The trajectory if it is impossible to join the lane of the merging destination is, for example, a trajectory for the own vehicle M to travel on the basis of the lower target speed of the first target speed and the second target speed. The traveling control unit 130 changes the lane to the lane L4 of the merging destination on the basis of the generated trajectory. Thereby, the process of the present flowchart ends.

Figure 11:
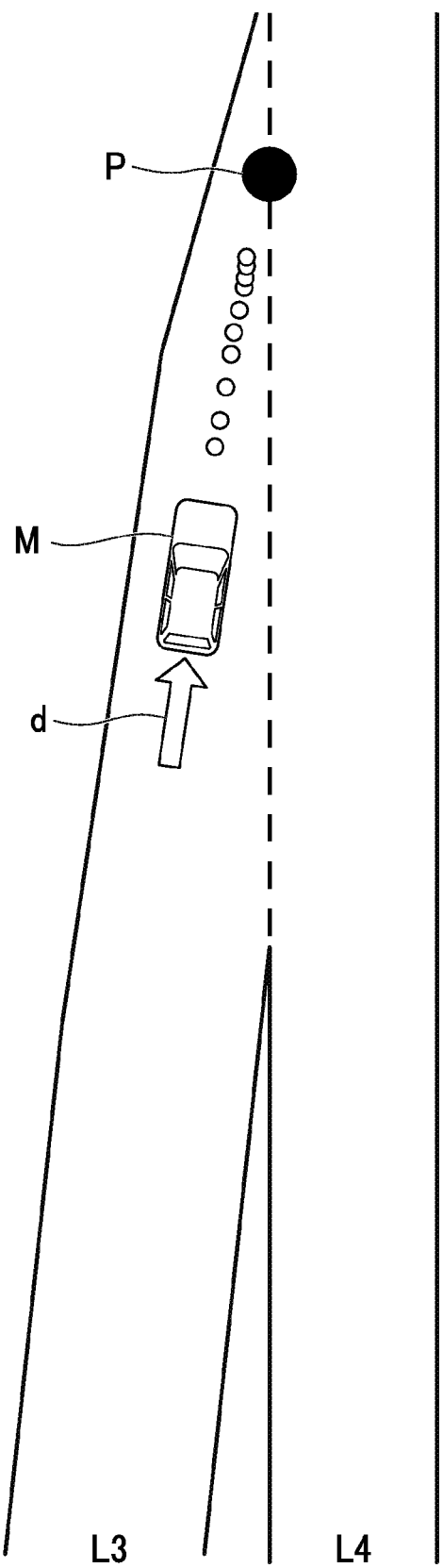
FIG. 11 is a diagram illustrating a state in which the own vehicle M stops in front of a merging point P.

Here, in a scene of merging, the second target speed is less than the first target speed because the speed at the merging point P is less than that of the front traveling vehicle mA (it is assumed that the merging ends and the vehicle is traveling along the main lane in the drawing). Accordingly, in step S110 of FIG. 10, the own vehicle M approaches the merging point P while decelerating because the second target speed is selected. At this time, if a condition of the merging (a lane change) is not satisfied, the own vehicle continues to decelerate and finally stops in front of the merging point P. FIG. 11 is a diagram illustrating a state in which the own vehicle M stops in front of the merging point P. Thereby, it is possible to prevent an inappropriate situation from occurring due to attempting unreasonable merging.

On the other hand, if the condition of the merging (the lane change) is satisfied, the own vehicle M rapidly performs merging after stopping deceleration control using the merging point P as the object OB. As a result, smooth merging is implemented after confirming that merging is safe.

[Travel Control]

The traveling control unit 130 sets the control mode to the automatic drive mode or the manual drive mode according to control by the control switching unit 140 and controls a control target including some or all of the traveling driving force output apparatus 90, the steering apparatus 92, and the brake apparatus 94 according to the set control mode. The traveling control unit 130 reads the action plan information 156 generated by the action plan generation unit 106 during the automatic drive mode, and controls the control target on the basis of an event included in the read action plan information 156.

For example, when the event is the lane keeping event, the traveling control unit 130 determines an amount of control of the electric motor in the steering apparatus 92 (for example, the number of revolutions) and an amount of control of the ECU in the traveling driving force output apparatus 90 (for example, a degree of opening of a throttle of the engine, a shift stage, or the like) according to a trajectory generated by the first trajectory generation unit 112. Specifically, the traveling control unit 130 calculates the speed of the own vehicle M for each predetermined time $\Delta t$ on the basis of a distance from the target position K of the trajectory and the predetermined time $\Delta t$ when the target position K has been arranged and determines an amount of control of the ECU in the traveling driving force output apparatus 90 according to the speed of each predetermined time $\Delta t$. Also, the traveling control unit 130 determines the amount of control of the electric motor in the steering apparatus 92 according to an angle formed by a traveling direction of the own vehicle M for each target position K and a direction of a subsequent target position based on the target position.

Also, if the above-mentioned event is the lane change event, the traveling control unit 130 determines an amount of control of the electric motor in the steering apparatus 92 and an amount of control in the traveling driving force output apparatus 90 according to the trajectory generated by the second trajectory generation unit 126.

The traveling control unit 130 outputs information indicating the amount of control determined for each event to a corresponding control target. Thereby, each of the apparatuses 90, 92, and 94 of control objects can control an own apparatus according to the information indicating the amount of control input from the traveling control unit 130. Also, the traveling control unit 130 appropriately adjusts the determined amount of control on the basis of a detection result of the vehicle sensor 60.

Also, the traveling control unit 130 controls the control target on the basis of an operation detection signal output by the operation detection sensor 72 during the manual drive mode. For example, the traveling control unit 130 outputs the operation detection signal output by the operation detection sensor 72 to each apparatus of the control target as it is.

The control switching unit 140 switches the control mode of the own vehicle M by the traveling control unit 130 from the automatic drive mode to the manual drive mode or from the manual drive mode to the automatic drive mode on the basis of the action plan information 156 generated by the action plan generation unit 106 and stored in the storage unit 150. Also, the control switching unit 140 switches the control mode of the own vehicle M by the traveling control unit 130 from the automatic drive mode to the manual drive mode or from the manual drive mode to the automatic drive mode on the basis of a control mode designation signal input from the changeover switch 80. That is, the control mode of the traveling control unit 130 can arbitrarily change to a traveling mode or a stop mode according to an operation of the driver or the like.

Also, the control switching unit 140 switches the control mode of the own vehicle M by the traveling control unit 130 from the automatic drive mode to the manual drive mode on the basis of the operation detection signal input from the operation detection sensor 72. For example, if an amount of operation included in an operation detection signal exceeds a threshold value, i.e., if the operation device 70 has received an operation of an amount of operation exceeding the threshold value, the control switching unit 140 switches the control mode of the traveling control unit 130 from the automatic drive mode to the manual drive mode. For example, when the traveling control unit 130 set to the automatic drive mode causes the own vehicle M to automatically travel, the control switching unit 140 switches the control mode of the traveling control unit 130 from the automatic drive mode to the manual drive mode if the driver operates the steering wheel, the accelerator pedal, or the brake pedal by an amount of operation exceeding the threshold value. Thereby, the vehicle control apparatus 100 can immediately switch the mode to the manual drive mode without any operation of the changeover switch 80 according to an instant operation performed by the driver when a physical object such as a human rushes out onto a roadway or a front traveling vehicle has abruptly stopped. As a result, the vehicle control apparatus 100 can cope with an emergency operation by the driver and improve safety during traveling.

According to the vehicle control apparatus 100, the vehicle control method, and the vehicle control program in the above-mentioned first embodiment, the vehicle control apparatus 100 can control the behavior of a vehicle with higher precision because a traveling of the own vehicle M is controlled on the basis of the target speed of the own vehicle M calculated on the basis of the speed of the object OB and a value based on a distance between the own vehicle M and the object OB.

Also, according to the vehicle control apparatus 100, the vehicle control method, and the vehicle control program in the above-mentioned first embodiment, it is possible to safely perform deceleration if there is the object OB which suddenly decelerates or stops in front of the own vehicle M because a traveling of the own vehicle M is controlled on the basis of a lower target speed of first and second target speeds for a plurality of objects OB.

According to the vehicle control apparatus 100, the vehicle control method, and the vehicle control program in the above-mentioned first embodiment, the vehicle control apparatus 100 specifies a speed of the front traveling vehicle mA traveling in front of the own vehicle M, an inter-vehicle distance between the front traveling vehicle mA and the own vehicle M, and a distance between the merging point P located in front of the own vehicle M and the own vehicle M, calculates a first target speed of the own vehicle M on the basis of the speed of the front traveling vehicle mA and a value based on the inter-vehicle distance between the own vehicle M and the front traveling vehicle, calculates a second target speed on the basis of a distance between the merging point P and the own vehicle M, and controls the traveling of the own vehicle M on the basis of a lower target speed of the calculated first and second target speeds, thereby safely performing deceleration in front of the merging point P if the merging of the own vehicle M is difficult. Also, the vehicle control apparatus 100 can rapidly perform merging if merging is possible.

Second Embodiment

Hereinafter, the second embodiment will be described. A vehicle control apparatus 100A in the second embodiment is different from the first embodiment in that the own vehicle M follows a vehicle traveling in front of the own vehicle M. Hereinafter, the related difference will be mainly described.

Figure 12:
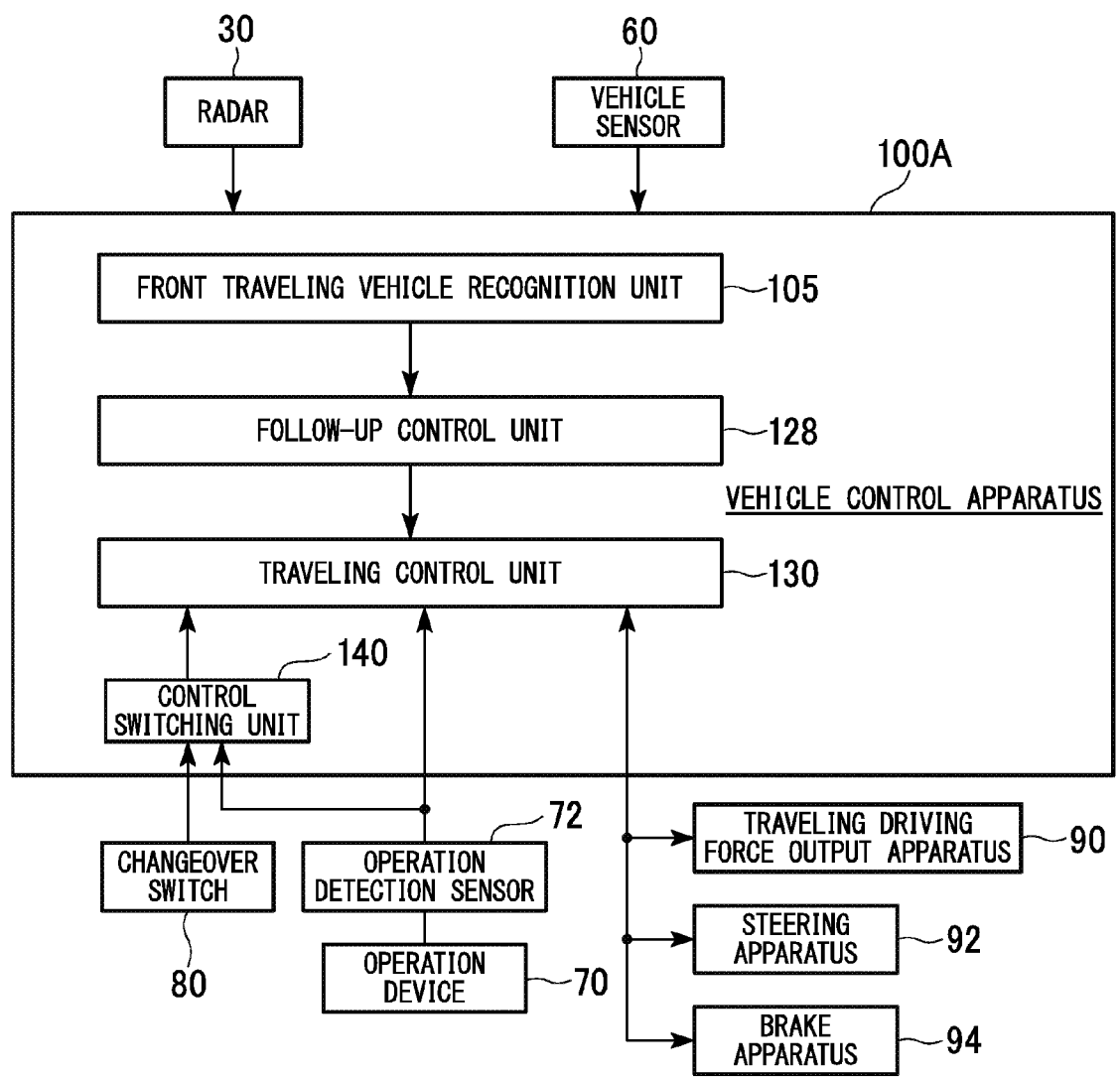
FIG. 12 is a diagram illustrating a functional configuration of a vehicle control apparatus 100A of a second embodiment.

FIG. 12 is a diagram illustrating a functional configuration of the vehicle control apparatus 100A of the second embodiment. The own vehicle M is equipped with a radar 30, a vehicle sensor 60, and the vehicle control apparatus 100A. The vehicle control apparatus 100A includes, for example, a front traveling vehicle recognition unit 105, a follow-up control unit 128, a traveling control unit 130, a control switching unit 140, and a storage unit 150. Hereinafter, description of a component or a functional unit similar to that of the first embodiment will be omitted.

The front traveling vehicle recognition unit 105 recognizes a front traveling vehicle mA detected by the radar 30. The follow-up control unit 128 controls the own vehicle M to travel to follow the front traveling vehicle mA by calculating a target speed on the basis of Equation (1) using the front traveling vehicle mA recognized by the front traveling vehicle recognition unit 105 as the object OB. The traveling control unit 130 acquires the target speed calculated by the follow-up control unit 128 and controls an amount of operation of a traveling driving force output apparatus 90, a brake apparatus 94, or an accelerator pedal so that the own vehicle M travels at the acquired target speed.

According to the vehicle control apparatus 100, the vehicle control method, and the vehicle control program in the above-mentioned second embodiment, a target speed of the own vehicle M is calculated on the basis of a speed of the front traveling vehicle mA set as the object OB and a value based on an inter-vehicle distance between the own vehicle M and the front traveling vehicle mA. Thereby, it is possible to cause the own vehicle M to rapidly decelerate even when the front traveling vehicle mA has rapidly decelerated.

According to the vehicle control apparatus 100, the vehicle control method, and the vehicle control program in the above-mentioned second embodiment, it is possible to control the behavior of a vehicle with higher precision when the vehicle follows the front traveling vehicle mA because the follow-up control unit 128 calculates a target speed of the own vehicle M on the basis of a speed of the object OB in front of the own vehicle M and a distance between the own vehicle M and the object OB, and controls the own vehicle M on the basis of the calculated target speed.

While modes for carrying out the present invention have been described above using embodiments, the present invention is not limited to the embodiments. Various modification and substitutions can be made without departing from the spirit or scope of the present invention.

What is claimed is:

1. A vehicle control apparatus comprising:
   a processor; and
   a sensor configured to specify a speed of an object located in front of an own vehicle and a distance between the object and the own vehicle,
   the processor being configured to:
   calculate a target speed of the own vehicle on the basis of the speed of the object and a value based on the distance; and
   control traveling of the own vehicle on the basis of the target speed,
   wherein the processor calculates the target speed of the own vehicle on the basis of the speed of the object and a difference between the distance and a target distance, and wherein the processor calculates the target distance by multiplying the speed of the object by a time required for the own vehicle to arrive at a current position of the object.

2. The vehicle control apparatus according to claim 1, wherein the processor calculates the target speed of the own vehicle by adding the speed of the object to a value obtained by multiplying the difference between the distance and the target distance by a first weight coefficient.

3. The vehicle control apparatus according to claim 1, wherein the processor further calculates the target speed of the own vehicle on the basis of a relative speed between the object and the own vehicle.

4. The vehicle control apparatus according to claim 3, wherein the processor calculates the target speed of the own vehicle by adding the speed of the object, a value obtained by multiplying a difference between the distance and a target distance by a first weight coefficient, and a value obtained by multiplying the relative speed by a second weight coefficient.

5. The vehicle control apparatus according to claim 1, wherein
the sensor specifies speeds of a plurality of objects located in front of the own vehicle and distances between the plurality of objects and the own vehicle,
the processor calculates a plurality of target speeds of the own vehicle in correspondence with the plurality of objects, and
the processor controls the traveling of the own vehicle on the basis of a lowest target speed of the plurality of target speeds of the own vehicle.

6. The vehicle control apparatus according to claim 1, wherein when the own vehicle enters a lane different from a traveling lane,
the sensor specifies speeds of a plurality of objects located in front of the own vehicle and distances between the plurality of objects and the own vehicle,
the processor calculates a plurality of target speeds of the own vehicle in correspondence with a plurality of objects, and
the processor controls the traveling of the own vehicle on the basis of a lowest target speed of the plurality of target speeds of the own vehicle.

7. A vehicle control apparatus comprising:
a processor and
a sensor configured to specify a speed of a front traveling vehicle traveling in front of an own vehicle, an inter-vehicle distance between the front traveling vehicle and the own vehicle, and a distance between a merging point located in front of the own vehicle and the own vehicle,
the processor being configured to:
calculate a first target speed of the own vehicle on the basis of the speed of the front traveling vehicle and a value based on the inter-vehicle distance, and calculate a second target speed of the own vehicle on the basis of the distance between the merging point and the own vehicle; and
control traveling of the own vehicle on the basis of a lower target speed of the first target speed and the second target speed.

8. The vehicle control apparatus according to claim 7, wherein the processor controls the traveling of the own vehicle without considering the lower target speed of the first target speed and the second target speed if the own vehicle is joinable at the merging point.

9. A vehicle control method comprising:
specifying, by an on-vehicle computer, a speed of an object located in front of an own vehicle and a distance between the object and the own vehicle;
calculating, by the on-vehicle computer, a target speed of the own vehicle on the basis of the specified speed of the object and a difference between the distance and a target distance;
controlling, by the on-vehicle computer, traveling of the own vehicle on the basis of the calculated target speed, and
calculating, by the on-vehicle computer, the target distance by multiplying the speed of the object by a time required for the own vehicle to arrive at a current position of the object.

10. A vehicle control program for causing an on-vehicle computer to:
specify a speed of an object located in front of an own vehicle and a distance between the object and the own vehicle;
calculate a target speed of the own vehicle on the basis of the specified speed of the object and a difference between the distance and a target difference;
control traveling of the own vehicle on the basis of the calculated target speed; and
calculate the target distance by multiplying the speed of the object by a time required for the own vehicle to arrive at a current position of the object.

* * * * *